Oct. 13, 1959  R. A. CRESSWELL ET AL  2,908,798
ELECTRIC ARC CUTTING
Filed Jan. 16, 1958
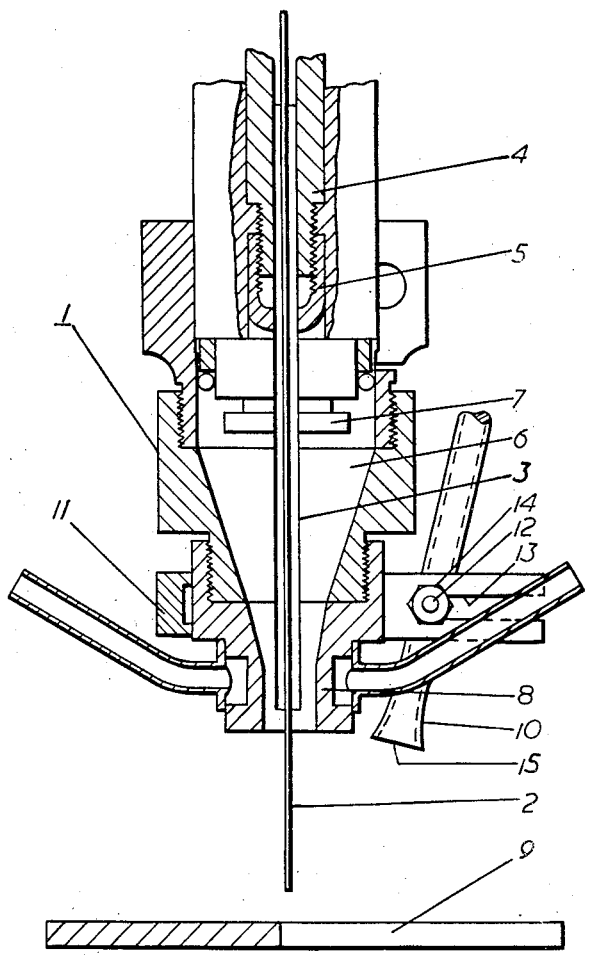
Inventor
ROBERT ARTHUR CRESSWELL
JAMES RONALD BRADSHAW
By
Aaron R. Townshend  Attorney United States Patent Office 2,908,798
Patented Oct. 13, 1959

2,908,798
ELECTRIC ARC CUTTING

Robert Arthur Cresswell, Surrey, and James Ronald Bradshaw, Brighton, England, assignors to The British Oxygen Company Limited, a British company Application January 16, 1958, Serial No. 709,336

Claims priority, application Great Britain January 31, 1957

8 Claims. (Cl. 219—69)

This invention relates to electric arc cutting.

Electric arc cutting of metals may be effected by continuously feeding a consumable electrode wire to a high density electric arc struck between said electrode wire and the metal to be cut, surrounding the electric arc with a shielding gas, and relatively moving the electrode and the metal to maintain the arc and cut the metal. It has been observed during the electric arc cutting of certain metals, particularly those with a relatively low thermal conductivity such as stainless steel, that there is a tendency for the molten metal to run along the bottom edge of each side of the cut and bridge the cut. Further, dross sometimes adheres to the bottom edge of the sides of the cut, and the removal of the dross and the bridging metal just referred to necessitates a cleaning operation after cutting has been completed.

According to one aspect of the present invention, in a method for the electric arc cutting of metals as described above, a jet of fluid is directed into the cut in proximity to the electric arc to remove unwanted material from the cut.

Apparatus for performing the method for the electric arc cutting of metals as described above, generally includes a nozzle through which a consumable electrode wire may be fed to an electric arc struck between the electrode wire and the metal to be cut, the nozzle being arranged to direct a shielding gas to surround the electric arc.

According to another aspect of the present invention, in electric arc cutting apparatus of the kind in which a consumable electrode is arranged to be fed towards a member to be cut and through a nozzle adapted to direct a shielding gas to surround an electric arc struck between the electrode and the member, an auxiliary nozzle is positioned in proximity to the nozzle to direct a jet of fluid into a cut formed by the electric arc to remove unwanted material from the cut.

The auxiliary nozzle may be positioned adjacent the nozzle in an adjustable manner whereby the direction of the jet may be varied in relation to the nozzle. The auxiliary nozzle may be mounted on the nozzle.

The outlet opening of the auxiliary nozzle may be elongated, the longer dimension of the outlet opening being arranged to extend longitudinally of the cut.

In some cases it may be desirable to form the nozzle and the auxiliary nozzle in a single member.

One construction of electric arc cutting apparatus in accordance with the present invention will now be described by way of example with reference to the accompanying diagrammatic drawing which shows the essential parts of the cutting head of the apparatus, mainly in axial section.

The cutting head comprises a tubular housing 1 through which a consumable electrode wire 2 may be fed continuously during a cutting operation. The electrode wire is fed to the cutting head in known manner from a remotely positioned storage reel by a feed roll driven by an electric motor. A contact tube 3 is mounted in the tubular housing 1 to conduct electric current to the electrode wire 2 passing through the tube 3 during operation. Shielding gas is arranged to be fed into the cutting head around the electrode wire 2. This gas stream passes through passages (not visible in the drawing) in a coupling member 4 and in a collet member 5, and is directed into a chamber 6 by a baffle member 7. A water cooled nozzle 8 is arranged to direct a stream of shielding gas from the chamber 6 around an electric arc struck between the electrode wire 2 and a metal workpiece 9 being cut.

An auxiliary nozzle 10 of tungsten carbide is mounted on a collar member 11 clamped to the nozzle 8, the auxiliary nozzle having affixed thereto a screw-threaded stud 12 which engages in a slot 13 in the collar member 11 and is retained in a desired position by a nut 14. In side elevation the auxiliary nozzle 10 is of fish-tail shape, the nozzle outlet 15 being elongated and the longer dimension of the nozzle outlet extending longitudinally of the cut. The internal dimensions of a typical nozzle outlet are ⅜ inch long by ⁵⁄₆₄ inch wide, and such an auxiliary nozzle 10 may be mounted with the axis of the outlet at a distance of the order of ¾ inch from the axis of the nozzle 8. In operation, the auxiliary nozzle 10 is arranged to direct a jet of fluid into the cut formed by the electric arc to remove unwanted material from the cut. The direction of this jet may be varied by adjusting the auxiliary nozzle 10 in relation to the nozzle 8. Thus the nozzle may be inclined forwardly as shown in the drawing or may direct the jet parallel to the electrode wire 2. In the cutting of thick plates it may be necessary to lower the auxiliary nozzle 10 so that the nozzle outlet is close to the bottom edge.

When cutting is being effected by this apparatus a ferrous electrode is fed through the nozzle 7 at a speed dependent on the thickness and type of material being cut but generally of the order of 350 to 400 inches per minute. The electrode is fed towards an electric arc struck between the wire 2 and the workpiece, and a shielding gas which may for example be argon, nitrogen, hydrogen, carbon dioxide or mixtures thereof is supplied through the nozzle at between 15 and 75 cubic feet per hour to surround the electric arc. The nozzle 8 is moved relatively to the workpiece to maintain the electric arc and cut the workpiece, and the auxiliary nozzle 10 moves behind the nozzle along the line of the cut. A jet of fluid is directed into the cut by the auxiliary nozzle at a suitable rate to remove unwanted material from the cut. For cutting ferrous materials nitrogen has been found most suitable as the gas supplied through the auxiliary nozzle, carbon dioxide being the next most suitable gas. For aluminium and copper, nitrogen may generally be preferred. Argon is preferably used when cutting titanium. Compressed air and other gases, and water, may be used in certain cases but these fluids may result in increased oxidation of the surfaces of the cut or may have other undesirable effects.

Numerical data for three typical applications of the method and apparatus described above will now be given by way of illustration.

*Example 1*

1 inch thick stainless steel plate was cut at a rate of 15 inches per minute using a mild steel electrode of .064 inch diameter. Voltage at the arc was 35 volts and the electric current was 750 to 800 amperes. The shielding gas was supplied through the nozzle 8 at a rate of 50 cubic feet per hour and consisted of a mixture of nitrogen and hydrogen in the ratio of 3 to 1 respectively. Carbon dioxide was directed into the cut adjacent the arc by the auxiliary nozzle 10 at a rate of 150 cubic feet per hour.

Example 2

1 inch thick aluminium plate was cut at a rate of 20 inches per minute using mild steel electrode of .064 inch diameter. Voltage at the arc was 35 volts and the electric current was 450 to 500 amperes. The shielding gas was supplied through the nozzle 8 at a rate of 50 cubic feet per hour and consisted of a mixture of nitrogen and hydrogen in the ratio of 3 to 1 respectively. Nitrogen was directed into the cut adjacent the arc by the auxiliary nozzle 10 at a rate of 150 cubic feet per hour.

Example 3

½ inch thick stainless steel plate was cut at the rate of 15 inches per minute using a mild steel electrode of .064 inch diameter supplied at a rate of 650 inches per minute. The shielding gas was supplied at 50 cubic feet per hour and consisted of argon. Nitrogen was directed into the cut adjacent the arc by the auxiliary nozzle 10 at the rate of 41 cubic feet per hour.

Satisfactory cuts, free from dross and free from bridging of the cut, were obtained by using the conditions specified in these three examples. Additionally with nitrogen supplied through the auxiliary nozzle it was observed that there was a reduction in the tendency for metal to build up on the lower part of the cut surfaces as a result of overheating of adjoining metal.

We claim.

1. In a method of electric arc cutting a metal workpiece which comprises continuously feeding a consumable electrode wire to a high density electric arc struck between the consumable electrode wire and the metal workpiece, surrounding the electric arc with a shielding gas, and moving the consumable electrode wire and the metal workpiece relatively to each other to maintain the electric arc and cut through the metal workpiece, the improvement which consists in directing a jet of fluid into the cut so formed in proximity to the electric arc thereby removing dross and any unwanted metal which has built up on the bottom edges of the cut sides of the workpiece behind the electric arc during the cutting operation.

2. A method as claimed in claim 1, wherein the fluid is a gas.

3. A method as claimed in claim 2, wherein a jet of nitrogen is directed into the cut.

4. A method as claimed in claim 2 wherein a jet of carbon dioxide is directed into the cut.

5. A method as claimed in claim 2, wherein a jet of compressed air is directed into the cut.

6. An electric arc cutting head of the kind which comprises a tubular housing, a contact tube mounted in the housing and arranged to conduct electric current to a consumable electrode wire fed through the contact tube, a nozzle on the housing through which the consumable electrode wire is fed from the contact tube, the nozzle being arranged to direct around the consumable electrode wire a stream of shielding gas flowing from the housing, characterised in that an auxiliary nozzle is positioned on the cutting head adjacent to the nozzle to direct a jet of fluid into a cut formed by an electric arc struck between the consumable electrode wire and a metal workpiece.

7. Electric arc cutting apparatus as claimed in claim 6, wherein the auxiliary nozzle is positioned adjacent the nozzle in an adjustable manner whereby the direction of the jet may be varied in relation to the nozzle.

8. Electric arc cutting apparatus as claimed in claim 6, wherein the outlet opening of the auxiliary nozzle is elongated, the longer dimension of the outlet opening being arranged to extend longitudinally of the cut.

References Cited in the file of this patent

UNITED STATES PATENTS

| | | |
|---|---|---|
| 1,436,557 | Wysong | Nov. 21, 1922 |
| 2,702,846 | Breymeier | Feb. 22, 1955 |
| 2,796,509 | Blake | June 18, 1957 |
| 2,821,615 | Fannon | Jan. 29, 1958 |

FOREIGN PATENTS

| | | |
|---|---|---|
| 143,331 | Great Britain | May 27, 1920 |
| 731,953 | Great Britain | June 15, 1955 |